US012367111B2

(12) United States Patent
Paikaray et al.

(10) Patent No.: US 12,367,111 B2
(45) Date of Patent: Jul. 22, 2025

(54) METHOD AND SYSTEM FOR DATABASE CYBER RESILIENCY

(71) Applicant: JPMorgan Chase Bank, N.A., New York, NY (US)

(72) Inventors: Raghunath Paikaray, Khorda (IN); Rama Shankar Sahu, Mumbai (IN); Amar Jain, Mumbai (IN); Jay Borhade, Mumbai (IN); Naresh E Andhe, Thane (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/218,922

(22) Filed: Jul. 6, 2023

(65) Prior Publication Data
US 2024/0394152 A1    Nov. 28, 2024

(30) Foreign Application Priority Data
May 22, 2023 (IN) .............................. 202311035488

(51) Int. Cl.
*G06F 11/00* (2006.01)
*G06F 11/14* (2006.01)

(52) U.S. Cl.
CPC ...... *G06F 11/1469* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 2015/0278039 A1* | 10/2015 | Bogdanov | G06F 11/1451 714/4.11 |
| 2016/0132398 A1* | 5/2016 | Cadarette | G06F 3/04842 707/674 |
| 2018/0143881 A1* | 5/2018 | Singer | G06F 11/2094 |
| 2019/0102257 A1* | 4/2019 | Zhou | G06F 11/1461 |
| 2019/0310920 A1* | 10/2019 | Rybczyk | G06F 11/1456 |
| 2019/0370368 A1* | 12/2019 | Kim | G06F 16/27 |
| 2020/0125449 A1* | 4/2020 | Mao | G06F 11/1466 |
| 2021/0342836 A1* | 11/2021 | Cella | H04L 9/3239 |
| 2022/0198562 A1* | 6/2022 | Cella | G06Q 40/04 |
| 2022/0366494 A1* | 11/2022 | Cella | H04L 9/50 |
| 2023/0269272 A1* | 8/2023 | Dambrot | H04L 63/1408 726/22 |

* cited by examiner

*Primary Examiner* — Farhan M Syed
(74) *Attorney, Agent, or Firm* — GREENBLUM & BERNSTEIN, P.L.C.

(57) ABSTRACT

A method and a system for providing database resiliency are disclosed. The method includes receiving a set of data from one or more sources at a primary database. Next, the method includes continuously monitoring for a potential detection of at least one anomaly in the set of data based on at least one activity performed on the set of data. Next, the method includes transmitting a plurality of data logs associated with the set of data from the primary database to an intermediate log storage location. Next, the method includes introducing a predefined delay to the plurality of data logs at the intermediate log storage location prior to a transmission of the plurality of data logs to a recovery database. Thereafter, the method includes performing a standby switchover to the recovery database in an event the at least one anomaly is detected at the primary database.

17 Claims, 5 Drawing Sheets

METHOD AND SYSTEM FOR DATABASE CYBER RESILIENCY

CROSS-REFERENCE TO RELATED APPLICATIONS

This application claims priority benefit from Indian application No. 202311035488, filed May 22, 2023 in the India Patent Office, which is hereby incorporated by reference in its entirety.

FIELD OF THE DISCLOSURE

This technology generally relates to methods and systems for database cyber resiliency, and more particularly to methods and systems for recovery and restoration of a Very Large Database (VLDB) in a specified Recovery Time Objective (RTO) in case of occurrence of at least one anomaly that may include cyber-attack, data corruption, or error in the VLDB.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

As is generally known, several organizations rely upon applications and databases for various tasks and operations. The proper functioning of the databases and applications is of utmost significance for the organization. In the event of a cyber-attack or data corruption, the restoration of business is required in a specified RTO. The smooth recovery and restoration of an organizational database is even more essential in the case of Critical Application Framework (CAF). On occurrence of an anomaly or unfavorable situations like data corruption by cyber-attack, organizations generally rely on "database backups" to recover the data and restore the CAF and databases to the functional state.

One major drawback of the conventional process for the recovery of data and restoration of CAF and databases to the functional state is the excessive consumption of time. The process associated with the recovery of data and restoration of database from "database backups" depends on factors such as the size of the database, network speed, and the like. Thus, the problem is even more prominent in the case of a Very Large Database, due to the large size of the database. The data associated with organizations grows significantly over a period of time along with enhanced dependency on CAF and databases. The time required for data recovery and CAF restoration is therefore an important factor in the performance of the organization.

Hence, in view of these and other existing limitations, there arises an imperative need to provide an efficient solution to overcome the above-mentioned limitations and to provide a method and system for database cyber resiliency in a reliable way.

SUMMARY

The present disclosure, through one or more of its various aspects, embodiments, and/or specific features or sub-components, provides, inter alia, various systems, servers, devices, methods, media, programs, and platforms for database cyber resiliency.

According to an aspect of the present disclosure, a method for providing database cyber resiliency is disclosed. The method is implemented by at least one processor. The method includes receiving, by the at least one processor via a communication interface, a set of data from at least one source at a primary database. Next, the method includes continuously monitoring, by the at least one processor using a trained model, for a potential detection of at least one anomaly in the set of data based on at least one activity performed on the set of data. Next, the method includes transmitting, by the at least one processor, a plurality of data logs associated with the set of data from the primary database to an intermediate log storage location. Next, the method includes introducing, by the at least one processor, a predefined delay to the plurality of data logs at the intermediate log storage location prior to a transmission of the plurality of data logs to a recovery database. Thereafter, the method includes performing, by the at least one processor, a standby switchover to the recovery database in an event the at least one anomaly is detected at the primary database.

In accordance with an exemplary embodiment, the method further includes stopping, by the at least one processor, the transmission of at least one of the plurality of data logs to the recovery database from the intermediate log storage location in the event the at least one anomaly is detected at the primary database.

In accordance with an exemplary embodiment, at least one from among the primary database, the intermediate log storage location, and the recovery database corresponds to at least one from among a local server and a cloud-based server.

In accordance with an exemplary embodiment, the at least one anomaly corresponds to an occurrence of at least one from among a cyber-attack, data corruption, and an error in the set of data.

In accordance with an exemplary embodiment, the trained model corresponds to one from among a supervised machine learning model and an unsupervised machine learning model.

In accordance with an exemplary embodiment, the plurality of data logs associated with the set of data is transmitted from the primary database to the intermediate log storage location by using a pull model.

In accordance with an exemplary embodiment, the method further includes receiving, by the at least one processor via the communication interface, the set of data at a secondary database from the primary database. The secondary database corresponds to a disaster recovery database.

According to another aspect of the present disclosure, a computing device configured to implement an execution of a method for providing database cyber resiliency is disclosed. The computing device includes a processor; a memory; and a communication interface coupled to each of the processor and the memory. The processor may be configured to receive, via the communication interface, a set of data from at least one source at a primary database. Next, the processor may be configured to continuously monitor, using a trained model, for a potential detection of at least one anomaly in the set of data based on at least one activity performed on the set of data. Next, the processor may be configured to transmit a plurality of data logs associated with the set of data from the primary database to an intermediate log storage location. Next, the processor may be configured to introduce a predefined delay to the plurality of data logs at the intermediate log storage location prior to a transmission of the plurality of data logs to a recovery database. Thereafter, the processor may be configured to perform a standby switchover to the recovery database in an event the at least one anomaly is detected at the primary database.

In accordance with an exemplary embodiment, the processor may be configured to stop the transmission of at least one of the plurality of data logs to the recovery database from the intermediate log storage location in the event the at least one anomaly is detected at the primary database.

In accordance with an exemplary embodiment, at least one from among the primary database, the intermediate log storage location, and the recovery database corresponds to at least one from among a local server and a cloud-based server.

In accordance with an exemplary embodiment, the at least one anomaly corresponds to an occurrence of at least one from among a cyber-attack, data corruption, and an error in the set of data.

In accordance with an exemplary embodiment, the trained model corresponds to one from among a supervised machine learning model and an unsupervised machine learning model.

In accordance with an exemplary embodiment, the plurality of data logs associated with the set of data is transmitted from the primary database to the intermediate log storage location by using a pull model.

In accordance with an exemplary embodiment, the processor may further be configured to receive, via the communication interface, the set of data at a secondary database from the primary database. The secondary database corresponds to a disaster recovery database.

According to yet another aspect of the present disclosure, a non-transitory computer readable storage medium storing instructions for providing database cyber resiliency is disclosed. The instructions include executable code which, when executed by a processor, may cause the processor to receive a set of data from at least one source at a primary database. Next, the processor may be configured to continuously monitor, using a trained model, for a detection of at least one anomaly in the set of data based on at least one activity performed on the set of data. Next, the processor may be configured to transmit a plurality of data logs associated with the set of data from the primary database to an intermediate log storage location. Next, the processor may be configured to introduce a predefined delay to the plurality of data logs at the intermediate log storage location prior to a transmission of the plurality of data logs to a recovery database. Thereafter, the processor may be configured to perform a standby switchover to the recovery database in an event the at least one anomaly is detected at the primary database.

In accordance with an exemplary embodiment, the executable code, when executed, may further cause the processor to stop the transmission of at least one of the plurality of data logs to the recovery database from the intermediate log storage location in the event the at least one anomaly is detected at the primary database.

In accordance with an exemplary embodiment, at least one from among the primary database, the intermediate log storage location, and the recovery database corresponds to at least one from among a local server and a cloud-based server.

In accordance with an exemplary embodiment, the at least one anomaly corresponds to an occurrence of at least one from among a cyber-attack, data corruption, and an error in the set of data.

In accordance with an exemplary embodiment, the trained model corresponds to one from among a supervised machine learning model and an unsupervised machine learning model.

In accordance with an exemplary embodiment, the plurality of data logs associated with the set of data is transmitted from the primary database to the intermediate log storage location by using a pull model.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

DETAILED DESCRIPTION

Figure 1:
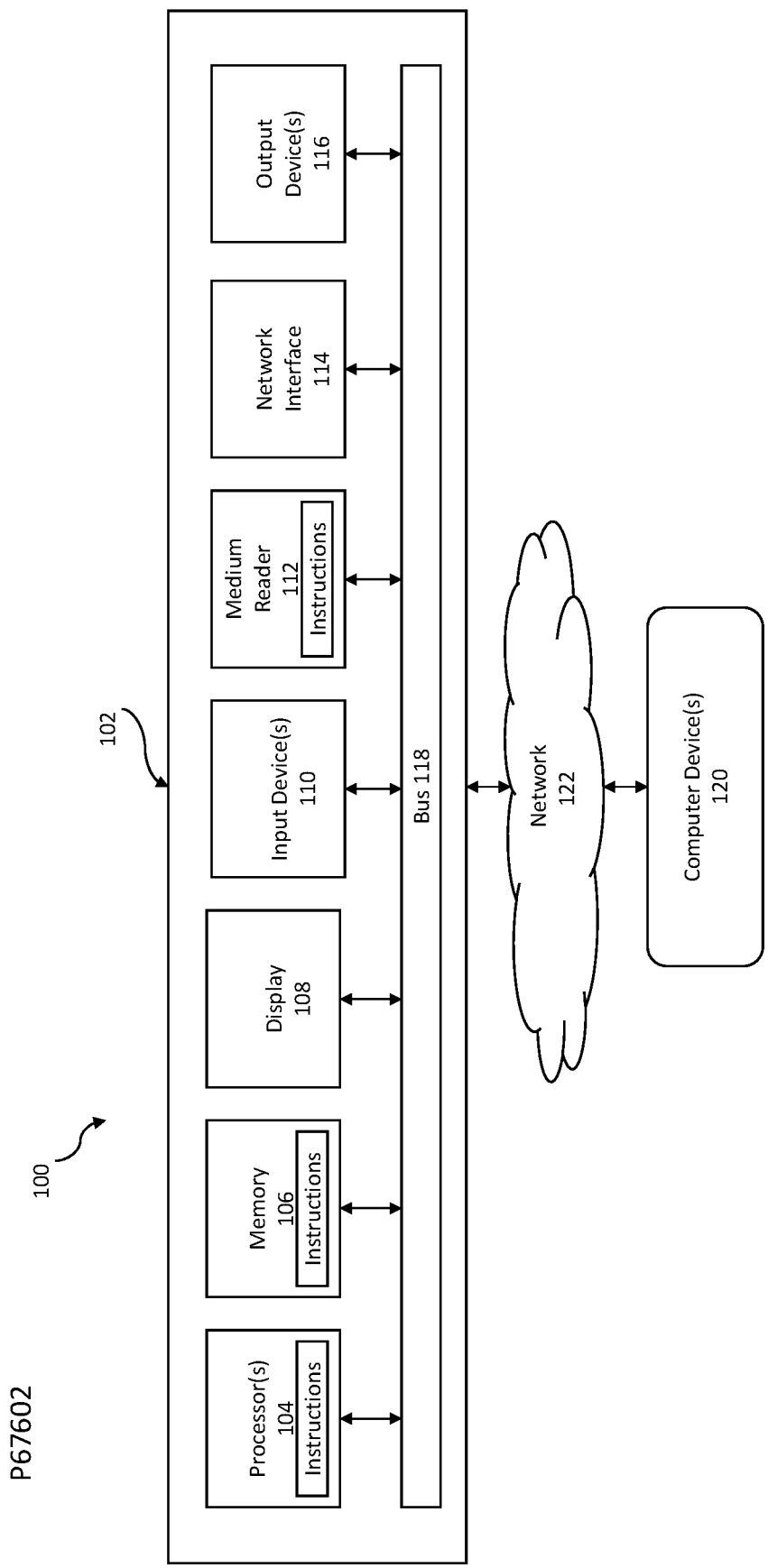
FIG. 1 illustrates an exemplary computer system for providing database cyber resiliency, in accordance with an exemplary embodiment.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to enable other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controller described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the present disclosure. It will be apparent however, that the present disclosure may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

To overcome the problems associated with excessive consumption of time in data recovery and restoration of the required tasks in case of occurrence of an anomaly in the form of a cyber-attack or data corruption in data, the present disclosure enables a method and a system for providing database cyber resiliency using a machine learning (ML) based trained model. The system first receives a set of data from one or more sources at a primary database. The set of data may be received in real-time or in batches. Next, the system continuously monitors, using a trained model, for a potential detection of at least one anomaly in the set of data based on at least one activity performed on the set of data. In an example, the system is configured to monitor activities that are associated with the set of data. The activity associated with the set of data may be performed by a user, support system, data hacker, and the like. The anomaly may be detected at the primary database based on the monitoring of the at least one activity performed on the set of data. In an exemplary embodiment, the at least one anomaly corresponds to an occurrence of at least one from among a cyber-attack, data corruption, and an error in the set of data. Further, the anomaly is an occurrence of error, deviation or any unfavorable changes in the set of data that significantly impact the performance of applications and database in the organization. The detection of the at least one anomaly is done by using the ML-based trained model.

Next, the system transmits a plurality of data logs associated with the set of data from the primary database to an intermediate log storage location. The term "intermediate database" can be used interchangeably with "intermediate log storage location" in the specification and carry the same meaning to the person skilled in the art.

The system further includes a secondary database connected with the primary database. The secondary database, used for disaster recovery, receives the plurality of data logs from the primary database based on a "push" model (also referred to herein as a "PUSH" model), where data logs are transmitted to the secondary database without any request for data logs made by the secondary database. On the other hand, in the case of a "pull" model (also referred to herein as a "PULL" model), the data logs are transmitted to the intermediate log storage location over a dedicated communication channel, where the dedicated communication channel closes automatically after the transmission of data logs from the primary database to the intermediate log storage location. In an example, the transmission of data logs from the primary database to the intermediate log storage location is based on a request made by the intermediate log storage location. In another example, the transmission of the plurality of data logs from the primary database to the intermediate log storage location is made at regular intervals and the communication channel is closed after the transmission of the plurality of data logs to the intermediate log storage location. The PULL model also provides the additional capability of preventing unauthorized access to the intermediate log storage location.

In a non-limiting example, the system is configured to monitor the set of data associated with the transaction and maintain a record of the transactions made in the past, total transactions, modification in data associated with the transactions, and the like. The records of data associated with the transactions are stored in a tabular format. The model in the present disclosure is trained using ML algorithms over the transaction records and transaction patterns. In an example, the transaction records comprise details including, but not limited to, author of the transaction, date of transaction, date of an update to the transaction, author making an update to the transaction, login details of the author, and the like. The trained model compares the record of the total transaction with the individual transaction record to detect errors or deviations in the transaction data and unauthorized access to the transaction records. The trained model is therefore capable of detecting errors and data theft to maintain the reliability of the transaction data records of the organization.

Next, the system introduces a predefined delay to the plurality of data logs at the intermediate log storage location prior to the transmission of the plurality of data logs to a recovery database. The intermediate log storage location and the recovery database are isolated from outside access as the intermediate log storage location and the recovery database operate through the PULL model. The PULL model prevents unauthorized access to the intermediate log storage location and the recovery database. In an example, the intermediate log storage location requests the plurality of data logs associated with the set of data from the primary database. The connection is closed after data logs are transmitted to the intermediate log storage location from the primary database. The PULL model ensures that intermediate log storage location and recovery database are always protected from outside data breaches and cyber-attacks. In an embodiment of the present disclosure, delay in the transmission of the data logs is pre-defined. In an example, the predefined delay may be a fixed number of weeks, days, or hours. In a non-limiting exemplary embodiment, the delay in the transmission of data logs depends on the size and complexity of the plurality of data logs, the size and complexity associated with the at least one anomaly in the plurality of data logs received at the intermediate log storage location. In an embodiment, the delay is introduced and monitored by the ML-based trained model.

In an exemplary embodiment, the system is configured to stop the transmission of at least one of the plurality of data logs to the recovery database from the intermediate log storage location in an event the at least one anomaly is detected at the primary database. The transmission of at least one of the plurality of data logs to the recovery database is stopped to prevent replication of the data logs associated with data anomaly at the recovery database.

Thereafter, the system is configured to perform a standby switchover to the recovery database in the event the at least one anomaly is detected at the primary database. The standby switchover to the recovery database facilitates recovery and restoration of a Very Large Database (VLDB) in a defined Recovery Time Objective (RTO) in case of occurrence of at least one anomaly in the VLDB.

In a non-limiting embodiment of the present disclosure, the system detects the at least one anomaly and applies a predetermined delay using one from among a supervised ML model and an unsupervised ML model.

In an example of the present disclosure, the primary database associated with an entity such as an organization in City X, the secondary database is located in City Y, and the recovery database is located in City Z. The primary database stores all the data associated with the applications and databases internal to the organization along with a record of the activities performed on the set of data at the primary database. In case of an occurrence of at least one activity associated with at least one from among a cyber-attack, data corruption, and an error in the set of data at the primary database, the recovery database located in city Z may be used as a temporary replacement of the primary database during the recovery and restoration of the primary database.

In another example of the present disclosure, there is the detection of anomaly in the set of data associated with Application A in the primary database of the organization. In general, the data recovery and restoration of Application A is done through a backup database storing the data logs associated with Application A in real-time or in batches based on the PULL model. However, this process is time-consuming and not recommended for a VLDB. Further, the anomaly in the set of data associated with Application A is replicated in the backup database as the backup database stores the plurality of data logs in real-time or in batches based on PULL model. Thus, the conventional solution is cumbersome and not recommended. Therefore, as per the solution of the present disclosure, the system is configured to store plurality of data logs in a recovery database with a pre-defined delay. The trained model is used to monitor for a potential detection of anomalies in the set of data in the primary database of the organization continuously. In case of detection of the anomaly in the set of data at the primary database, the trained model is configured to prevent the anomaly from being replicated in the recovery database. The recovery database may then be used as the primary database, thereby ensuring continuous availability of the CAF.

Therefore, the present disclosure aids in achieving faster recovery of data and restoration of CAF and organizational databases. The implementation of the features of the present disclosure is equally beneficial to the cloud-based service providers as they are able to keep up with the agreed-upon RTO as per the Service Level Agreements (SLAs). In an example, the organization database and system may return to Business as Usual (BAU) in a shorter period of time due to the enhanced reliability of the recovery database. Further, the application of the PULL model prevents any outside entity from connecting to the intermediate log storage location. The recovery database receives data logs from the intermediate log storage location and is therefore isolated from unauthorized access. The reliability and authenticity of data logs in the recovery database are enhanced and ensure that data logs in the recovery database are always protected from data breaches and cyber-attack. The implementation of features of the present disclosure results in achieving better efficiency and performance owing to the factors explained above. In an example, factors include but are not limited to faster recovery, greater reliability of the recovery database, and preventing unauthorized access to the recovery database. The embodiment as disclosed herein enables faster restoration of BAU where the recovery database act as the primary database in an event associated with the detection of the anomaly in the form of data corruption, cyber-attack, or error in the set of data.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks, or cloud-based environments. Even further, the instructions may be operative in such a cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, the primary database corresponds to a main database associated with an entity such as an organization. The primary database stores all the information and a set of data associated with at least one entity such as the organization. In addition, the database may be related to the various applications, including but not limited to CAF, and data sources internal to the organization.

As used herein, one or more of the primary database, the intermediate log storage location, and the recovery database corresponds to at least one from among a local server and a cloud-based server.

As used herein, the secondary database corresponds to a disaster recovery database and stores the same replica of the set of data stored in the primary database. The secondary database receives data logs from the primary database in real-time or in batches using the PUSH model. The secondary database is used for resiliency purposes in case of unavailability of the primary database due to factors including but not limited to site outage, connectivity issues, and the like.

As used herein, the recovery database may refer to a standby database. The recovery database is used in place of the primary database in an event the at least one anomaly associated with a cyber-attack or data corruption is detected at the primary database. The recovery database uses the PULL model to receive the plurality of data logs from the primary database and is protected from unauthorized access.

As used herein, an anomaly corresponds to an occurrence of at least one from among a cyber-attack, data corruption, and an error in the set of data.

As used herein, the data logs are retrieved from the primary database, the secondary database, and the recovery database in the First-In-First-Out (FIFO) manner.

As used herein, the predetermined delay corresponds to the defined time lag applied in transmitting data logs from the intermediate log storage location to the recovery database. In an exemplary non-limiting embodiment, the time lag depends on the size and complexity of the plurality of data logs, the size, and complexity associated with the at least one anomaly in the plurality of data logs received at the intermediate log storage location.

As used herein, plurality of data sources refers to sources of the set of data associated with the organization and the applications used by the organization. In an example, the primary database may receive the set of data from Source A and Source B.

As used herein, VLDB corresponds to a database that contains a very large amount of data. In an example, VLDB may refer to the database with a storage capacity of at least 30 terabytes.

As illustrated in FIG. 1, the computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable storage mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a Display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments enable optimized methods and systems for providing database cyber resiliency.

Figure 2:
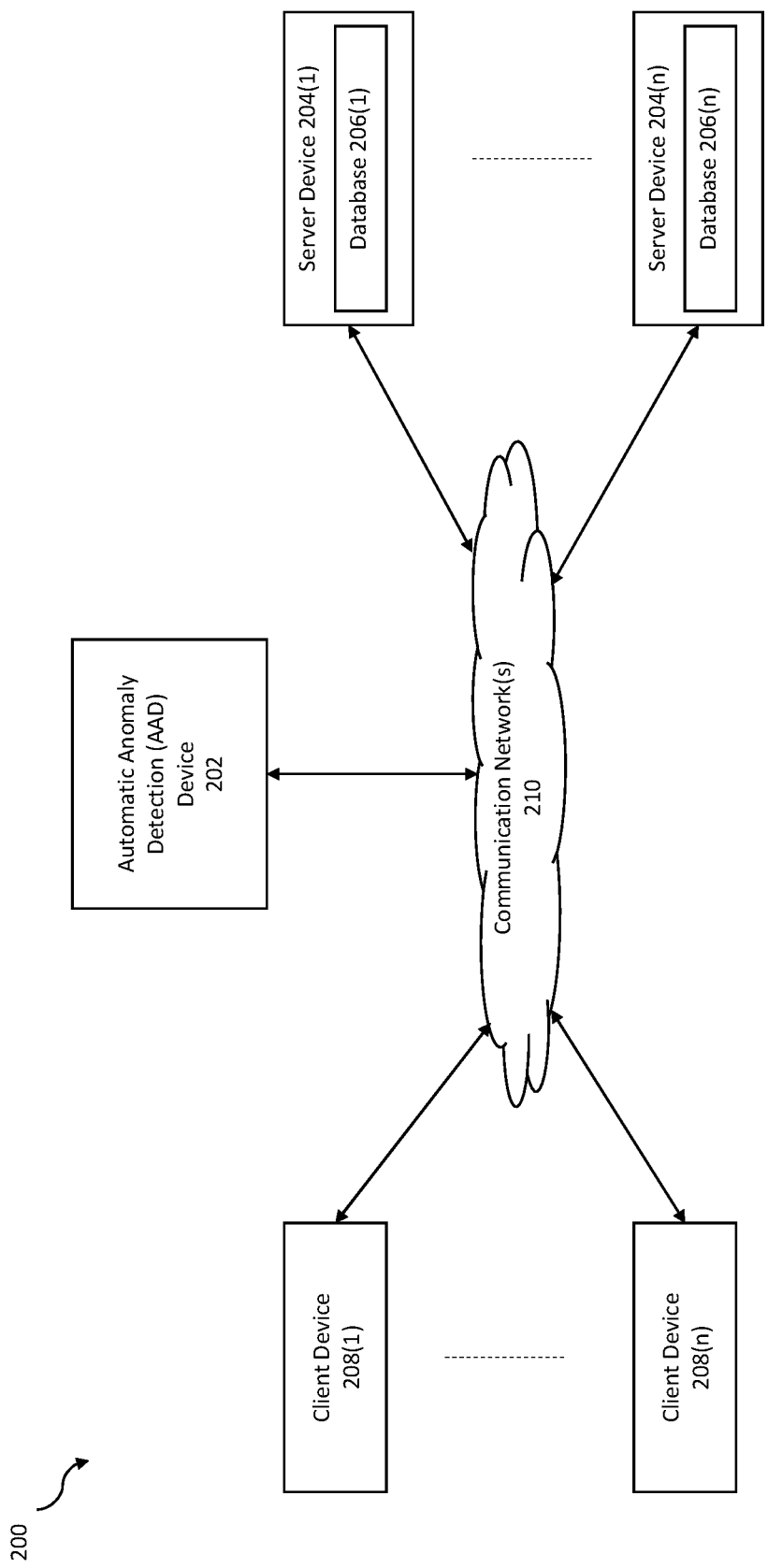
FIG. 2 illustrates an exemplary diagram of a network environment for providing database cyber resiliency, in accordance with an exemplary embodiment.

Referring to FIG. 2, a schematic of an exemplary network environment 200 for implementing a method for providing database cyber resiliency is illustrated. In an exemplary embodiment, the method is executable on any networked computer platform, such as, for example, a personal computer (PC).

The method for providing database cyber resiliency may be implemented by an Automatic Anomaly Detection (AAD) device 202. The AAD device 202 may be the same or similar to the computer system 102 as described with respect to FIG. 1. The AAD device 202 may store one or more applications that can include executable instructions that, when executed by the AAD device 202, cause the AAD device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as virtual machine(s) or virtual server(s) that may be managed in a cloud-based computing environment. Also, the application(s), and even the AAD device 202 itself, may be located in virtual server(s) running in a cloud-based computing environment rather than being tied to one or more specific physical network computing devices. Also, the application(s) may be running in one or more virtual machines (VMs) executing on the AAD device 202. Additionally, in one or more embodiments of this technology, virtual machine(s) running on the AAD device 202 may be managed or supervised by a hypervisor.

In the network environment 200 of FIG. 2, the AAD device 202 is coupled to a plurality of server devices 204(1)-204(n) that hosts a plurality of databases 206(1)-206(n), and also to a plurality of client devices 208(1)-208(n) via communication network(s) 210. A communication interface of the AAD device 202, such as the network interface 114 of the computer system 102 of FIG. 1, operatively couples and communicates between the AAD device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used. Additionally, the term "Network interface" may also be referred to as "Communication interface" and such phrases/terms can be used interchangeably in the specifications.

The communication network(s) 210 may be the same or similar to the network 122 as described with respect to FIG. 1, although the AAD device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer-readable storage media, and AAD devices that efficiently implement a method for providing database cyber resiliency in case of an occurrence of at least one anomaly in the VLDB.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), Public Switched Telephone Network (PSTNs), Ethernet-based Packet Data Networks (PDNs), combinations thereof, and the like.

The AAD device 202 may be a standalone device or integrated with one or more other devices or apparatuses, such as one or more of the server devices 204(1)-204(n), for example. In one particular example, the AAD device 202 may include or be hosted by one of the server devices 204(1)-204(n), and other arrangements are also possible. Moreover, one or more of the components of the AAD device 202 may be in a same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the AAD device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to anomaly, delay, recovery solutions, possible recovery solutions, software programs, and/or ML models.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AAD device 202 via communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, e.g., a smartphone.

The client devices 208(1)-208(n) may run interface applications, such as standard web browsers or standalone client applications, which may provide an interface to communicate with the AAD device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AAD device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AAD device 202, the server devices 204(1)-204(n), or the client devices 208(1)-208(n), for example, may be configured to operate as virtual instances on the same physical machine. In other words, one or more of the AAD devices 202, the server devices 204(1)-204(n), or the client devices 208(1)-208(n) may operate on the same physical device rather than as separate devices communicating through communication network(s) 210. Additionally, there may be more or fewer AAD devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
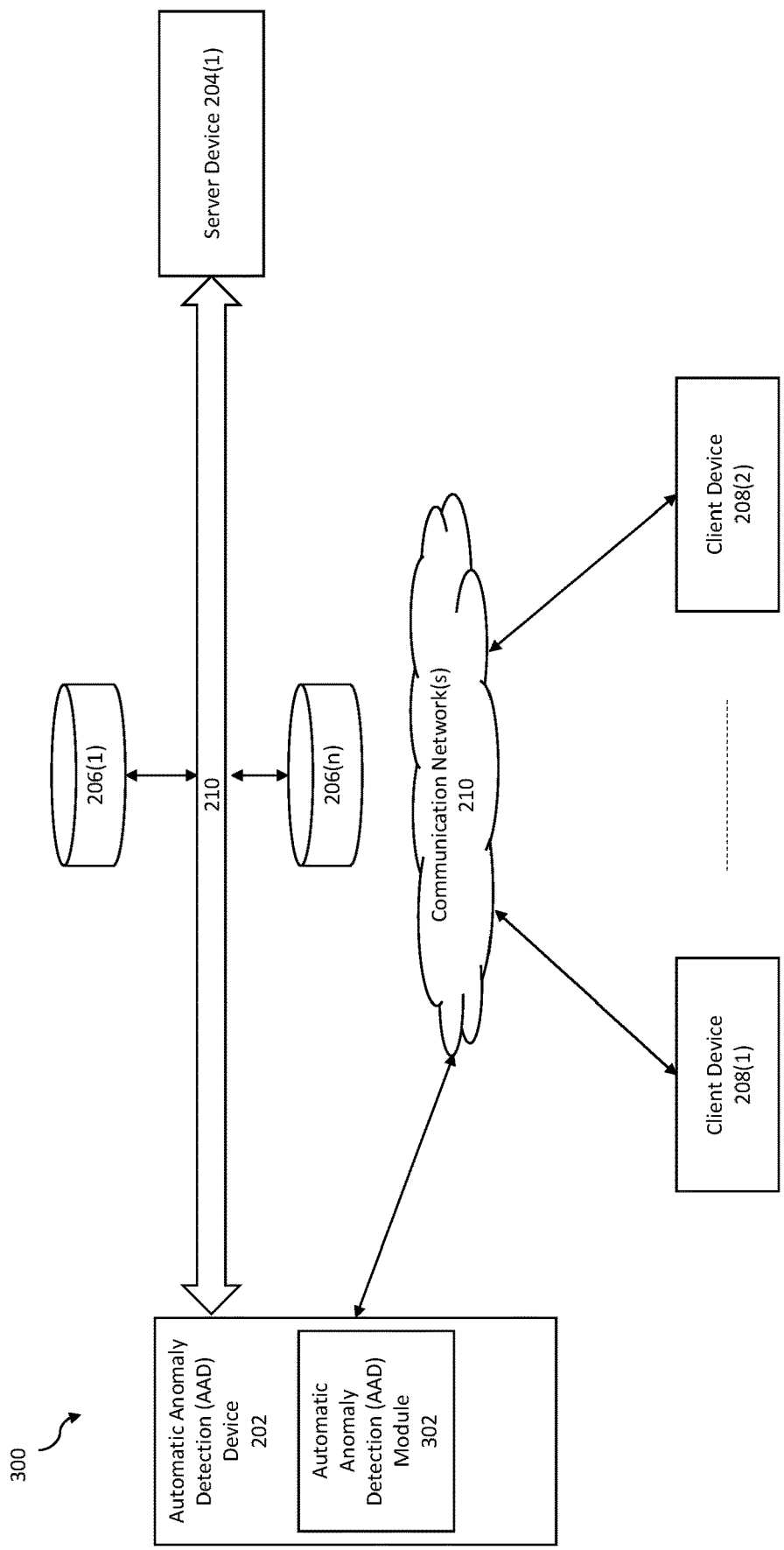
FIG. 3 illustrates an exemplary system for implementing a method for providing database cyber resiliency, in accordance with an exemplary embodiment.

FIG. 3 illustrates an exemplary system for implementing a method for providing database cyber resiliency, in accordance with an embodiment of the present disclosure. As illustrated in FIG. 3, according to exemplary embodiments, the system 300 may comprise an AAD device 202 including an Automatic Anomaly Detection (AAD) module 302 that may be connected to a server device 204(1) and one or more repository 206(1) . . . 206(n) via a communication network 210, but the present disclosure is not limited thereto.

The AAD device 202 is described and shown in FIG. 3 as including an AAD module 302, although it may include other rules, policies, modules, databases, or applications, for example. As will be described below, the AAD module 302 is configured to implement the method for providing database cyber resiliency.

An exemplary process 300 for implementing a mechanism for providing database cyber resiliency by utilizing the network environment of FIG. 2 is shown as being executed in FIG. 3. Specifically, a first client device 208(1) and a second client device 208(2) are illustrated as being in communication with AAD device 202. In this regard, the first client device 208(1) and the second client device 208(2) may be "clients" of the AAD device 202 and are described herein as such. Nevertheless, it is to be known and understood that the first client device 208(1) and/or the second client device 208(2) need not necessarily be "clients" of the AAD device 202, or any entity described in association therewith herein. Any additional or alternative relationship may exist between either or both of the first client device 208(1) and the second client device 208(2) and the AAD device 202, or no relationship may exist.

Further, AAD device 202 is illustrated as being able to access the one or more repositories 206(1) 206(n). The AAD module 302 may be configured to access these repositories/databases for implementing the method for providing database cyber resiliency in the VLDB.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AAD device 202 via broadband or cellular communication. Of course, these embodiments are merely exemplary and are not limiting or exhaustive.

Figure 4:
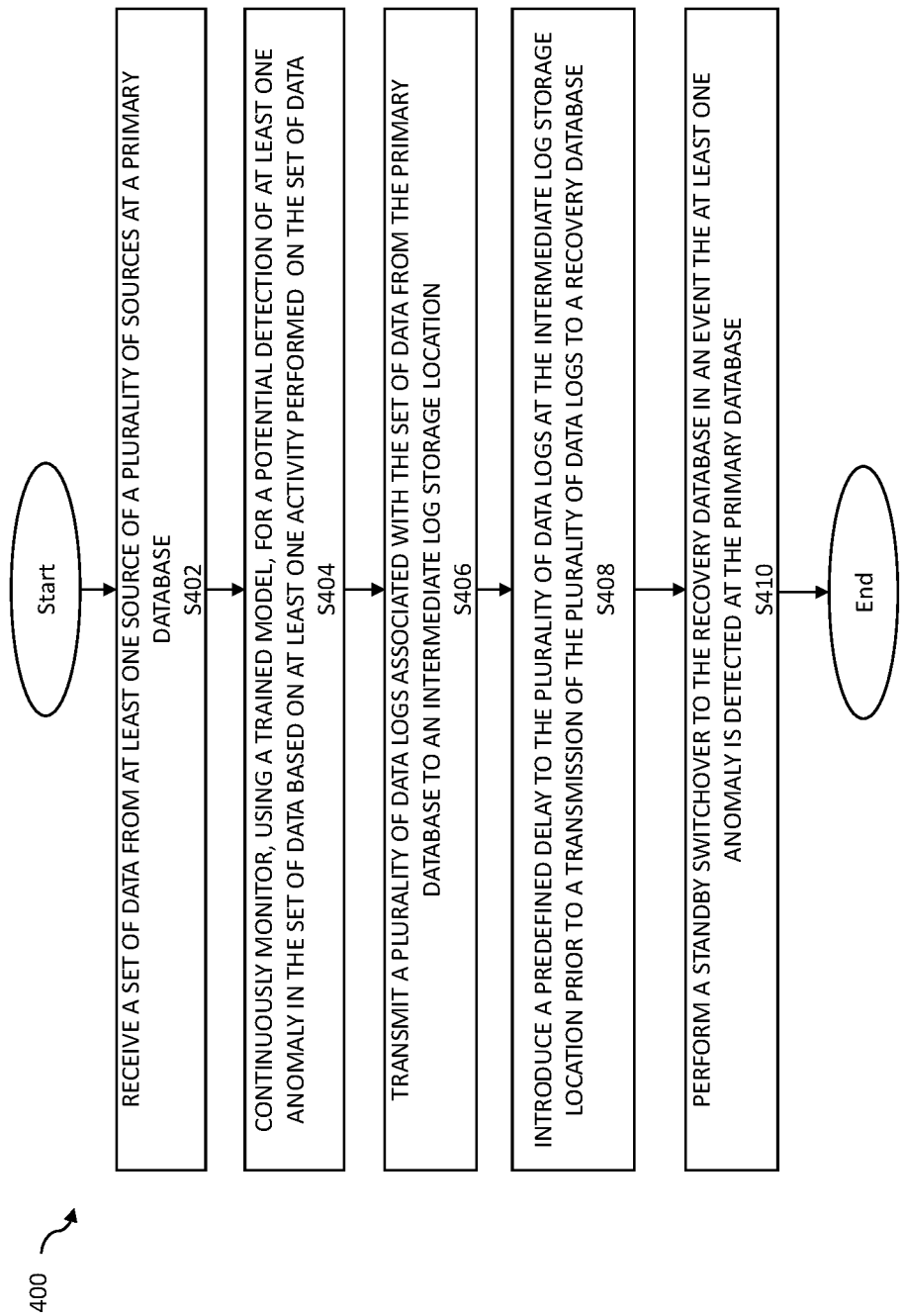
FIG. 4 illustrates an exemplary method flow diagram for providing database cyber resiliency, in accordance with an exemplary embodiment.

FIG. 4 illustrates a method 400 for providing database cyber resiliency, in accordance with an exemplary embodiment. As shown in FIG. 4, the method begins following a need for a recovery of data and restoration of an organizational database to the functional state in a specified RTO.

At step S402, the method includes receiving, by the at least one processor 104 via a communication interface 114, a set of data from at least one source at a primary database. In an exemplary embodiment, the set of data is received at the primary database from a plurality of data sources in real-time or in batches. The plurality of sources may correspond to sources of data from where the data is received at the primary database. In an example, the plurality of sources may include a local server of an organization, a temporary storage medium, a hard disk, a cloud-based server, at least one entity associated with the organization, and the like.

In an example, the set of data includes the transaction data of the organization. In a non-limiting embodiment, the set of data received at the primary database is further transmitted and stored in a secondary database in real-time or in batches using a PUSH model, e.g., without a request made for the data logs by the secondary database. The secondary database is therefore susceptible to replication of data, data logs, and data activities associated with data anomaly. The secondary database corresponds to a disaster recovery database. The secondary database is used for resiliency purposes in case of unavailability of the primary database due to factors including but not limited to site outage, connectivity issues, and the like.

At step S404, the method includes continuously monitoring, by the at least one processor 104 using a trained model, for a potential detection of at least one anomaly in the set of data based on at least one activity performed on the set of data. In an exemplary embodiment, the at least one anomaly corresponds to an occurrence of at least one from among a cyber-attack, data corruption, and an error in the set of data. In an example, the activity on the set of data may be performed by a user associated with an organization, automated support system, application support team, a data hacker, and the like. In an exemplary embodiment, the trained model corresponds to one from among a supervised ML model and an unsupervised ML model. In an exemplary embodiment, ML based trained model may use supervised learning algorithms such as, for example, k-method analysis, regression analysis, decision tree analysis, random forest analysis, k-nearest neighbor's analysis, logistic regression analysis, K-fold cross-validation analysis, balanced class weight analysis, etc.

At step S406, the method includes transmitting, by the at least one processor 104, a plurality of data logs associated with the set of data from the primary database to an intermediate log storage location. The plurality of data logs associated with the set of data is transmitted from the primary database to the intermediate log storage location by using a PULL model. In an example, data logs associated with Application A are transmitted and stored in the intermediate log storage location using the PULL model, e.g., a request for the data logs is made by the intermediate log storage location. The PULL model ensures the prevention of unauthorized access to the intermediate log storage location thereby always protecting the intermediate log storage location from the unauthorized access or cyber-attacks.

At step S408, the method includes introducing, by the at least one processor 104, a predefined delay to the plurality of data logs at the intermediate log storage location prior to a transmission of the plurality of data logs to a recovery database. In an example, the predefined delay is fixed to apply at the intermediate log storage location prior to transmission to the recovery database. The predefined delay may be a fixed delay of weeks, days, or hours. In another example, the delay in the transmission of the data logs depends on the size and complexity of the plurality of data logs, the size and complexity associated with the at least one anomaly in the plurality of data logs received at the intermediate log storage location. In an example, the trained model detects the at least one anomaly in set of data at the primary database related to application A within the duration of the predetermined delay, to prevent the at least one anomaly from getting replicated in the recovery database.

At step S410, the method includes performing, by the at least one processor 104, a standby switchover to the recovery database in an event the at least one anomaly is detected at the primary database. In an exemplary embodiment, the method further includes stopping, by the at least one processor 104, the transmission of at least one of the plurality of data logs to the recovery database from the intermediate log storage location in the event the at least one anomaly is detected at the primary database. The method may further include alerting, by the at least one processor 104, at least one entity associated with the primary database on the occurrence of at least one anomaly at the primary database. The at least one entity may include a data support team, data recovery team, production support team, and the like.

In an example, at least one data file related to application A from the set of data in the primary database is detected to be associated with the at least one anomaly. The at least one data file associated with the at least one anomaly is prevented from getting stored and replicated in the recovery database. This ensures the integrity and authenticity of data stored in the recovery database. The recovery database is used in place of the primary database, thereby performing the functions of the primary database, in an event the at least one anomaly is detected at the primary database. This ensures continuous availability of the Critical Application Framework (CAF) while the primary database is recovered. The method also provides the time for the resolution of the at least one anomaly and causes of the at least one anomaly at the primary database. The method saves the time consumed in full database recovery and restoration. After restoring the Business as Usual (BAU) using the recovery database, the method terminates.

Figure 5:
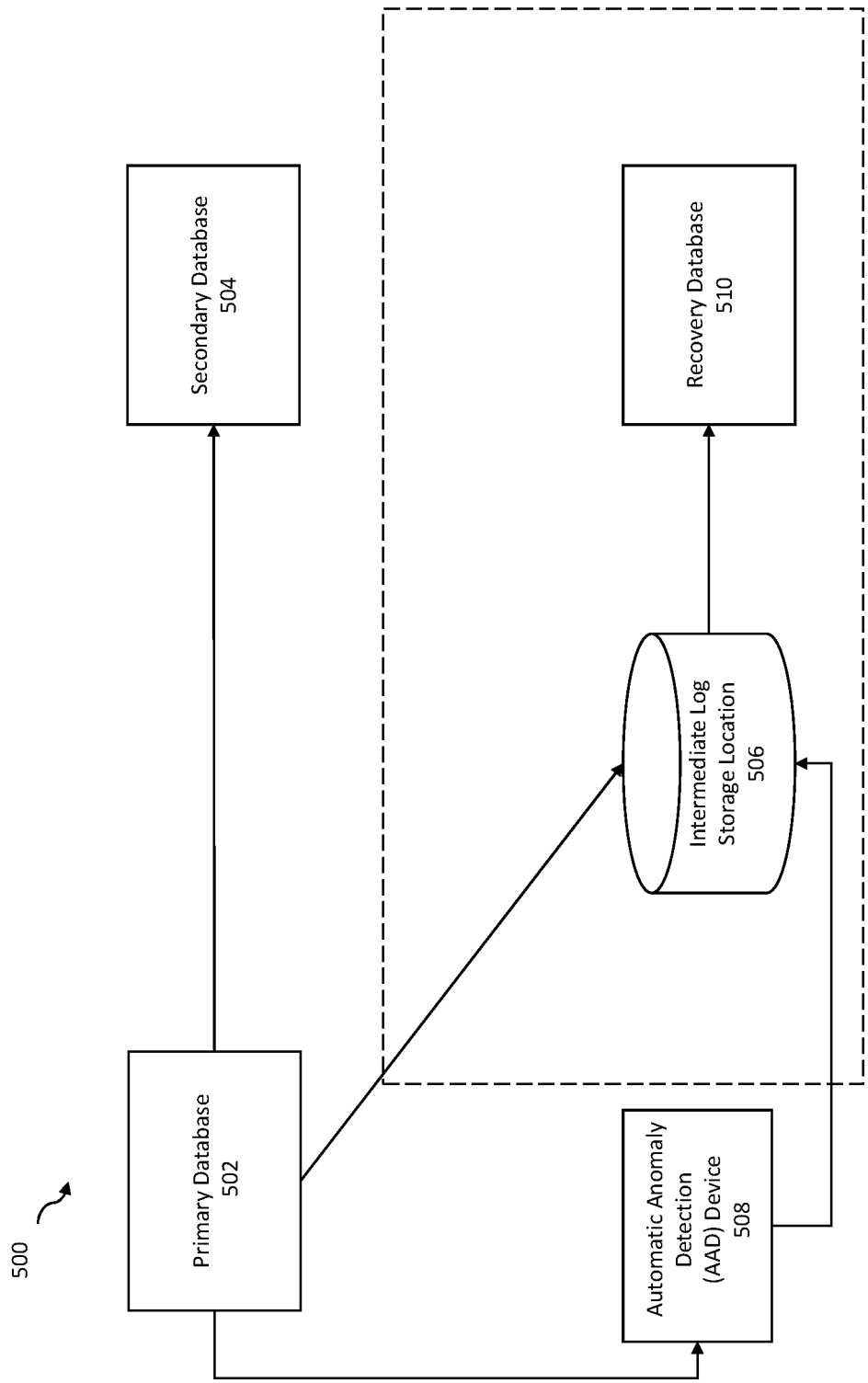
FIG. 5 illustrates a process flow usable for implementing a method for providing database cyber resiliency in accordance with an exemplary embodiment.

FIG. 5 illustrates a process flow usable for implementing a method for database cyber resiliency, in accordance with an embodiment of the present disclosure. As illustrated in FIG. 5, the process flow 500 begins with receiving a set of data from at least one source from among a plurality of data sources to a primary database 502. Further, a plurality of data logs associated with the set of data is transmitted to the intermediate log storage location 506 in real-time or in batches based on a request received from the intermediate log storage location. The AAD device 508 continuously monitors for a potential detection of the occurrence of at least one anomaly in the set of data based on at least one activity performed on the set of data. The AAD device 508 applies a pre-defined delay in transmitting the plurality of data logs from the intermediate log storage location to the recovery database 510. This prevents the at least one anomaly from getting replicated in the recovery database. The recovery database may then be used for the restoration of the organizational database and CAF in the event of anomaly detection. In an event the at least one anomaly is detected at the primary database, the recovery database takes over the role of the primary database. In an example, the recovery and restoration of the primary database is performed by the technical support team while the BAU is already restored by using the recovery database.

Accordingly, with this technology, an optimized process for providing database cyber resiliency is disclosed. As evident from the present disclosure, the present solution provides significant technical advancement over the existing solutions by ensuring recovery and restoration of a VLDB using the trained model in case of an occurrence of the at least one anomaly at the primary database. The use of the present technology ensures faster recovery in case of an occurrence of the at least one anomaly e.g., data corruption, cyber-attack, error, or deviation in the set of data at the primary database. The use of the present disclosure further prevents unauthorized access to the recovery database. Therefore, as disclosed, the present embodiment provides a solution for faster restoration of BAU where the recovery database function as the primary database in an event associated with detection of the at least one anomaly, data corruption, and cyber-attack at the primary database.

Although the present disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable storage medium may be described as a single medium, the term "computer-readable storage medium" includes a single medium or multiple media, such as a centralized or distributed database, and/or associated caches and servers that store one or more sets of instructions. The term "computer-readable storage medium" shall also include any medium that is capable of storing, encoding or carrying a set of instructions for execution by a processor or that cause a computer system to perform any one or more of the embodiments disclosed herein.

The computer-readable storage medium may comprise a non-transitory computer-readable storage medium or media and/or comprise a transitory computer-readable storage medium or media. In a particular non-limiting, exemplary embodiment, the computer-readable storage medium can include a solid-state memory such as a memory card or other package that houses one or more non-volatile read-only memories. Further, the computer-readable storage medium can be a random-access memory or other volatile re-writable memory. Additionally, the computer-readable storage medium can include a magneto-optical or optical medium, such as a disk or tapes or other storage device to capture carrier wave signals such as a signal communicated over a transmission medium. Accordingly, the present disclosure is considered to include any computer-readable storage medium or other equivalents and successor media, in which data or instructions may be stored.

Although the present application describes specific embodiments which may be implemented as computer programs or code segments in computer-readable storage media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer readable storage medium storing instruction for database cyber resiliency is disclosed. The storage medium including executable code which, when executed by a processor, may cause the processor to receive a set of data from at least one source from among a plurality of sources at a primary database; continuously monitor for a potential detection of at least one anomaly in the set of data based on at least one activity performed on the set of data; transmit a plurality of data logs associated with the set of data from the primary database to an intermediate log storage location; introduce a predefined delay to the plurality of data logs at the intermediate log storage location prior to a transmission of the plurality of data logs to a recovery database; and perform a standby switchover to the recovery database in an event the at least one anomaly is detected at the primary database. As used herein, standby switchover refers to a role reversal between the primary database and the recovery database for a predefined time interval.

In an embodiment of the present disclosure, the executable code when executed further causes the processor to stop the transmission of at least one of the plurality of data logs to the recovery database from the intermediate log storage location in the event the at least one anomaly is detected at the primary database. At least one of the primary database, the intermediate log storage location, and the recovery database corresponds to at least one from among a local server and a cloud-based server. The at least one anomaly corresponds to an occurrence of at least one from among a cyber-attack, data corruption, and an error in the set of data. The trained model corresponds to one from among a supervised machine learning model and an unsupervised machine learning model. The plurality of data logs associated with the set of data is transmitted from the primary database to the intermediate log storage location using a PULL model.

Although the present specification describes components and functions that may be implemented in particular embodiments with reference to particular standards and protocols, the present disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the present disclosure. Other embodiments may be utilized and derived from the present disclosure, such that structural and logical substitutions and changes may be made without departing from the scope of the present disclosure. Additionally, the illustrations are merely representational and may not be drawn to scale. Certain proportions within the illustrations may be exaggerated, while other proportions may be minimized. Accordingly, the present disclosure and the figures are to be regarded as illustrative rather than restrictive.

One or more embodiments of the present disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This present disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the present disclosure. This present disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing database cyber resiliency, the method being implemented by at least one processor, the method comprising:
   receiving, by the at least one processor via a communication interface, a set of data from at least one source at a primary database;
   continuously monitoring, by the at least one processor using a trained model, for a potential detection of at least one anomaly in the set of data based on at least one activity performed on the set of data;
   transmitting, by the at least one processor, a plurality of data logs associated with the set of data from the primary database to an intermediate log storage location;
   introducing, by the at least one processor, a predefined delay to the plurality of data logs at the intermediate log storage location prior to a transmission of the plurality of data logs to a recovery database; and
   performing, by the at least one processor, a standby switchover to the recovery database in an event the at least one anomaly is detected at the primary database,
   wherein the trained model is configured to perform the monitoring for the potential detection of the at least one anomaly by using at least one from among a k-method analysis algorithm, a decision tree analysis algorithm a k-nearest neighbor's analysis algorithm, a k-fold cross-validation analysis algorithm, and balanced class weight analysis algorithm, and
   wherein the at least one anomaly corresponds to an occurrence of at least one from among a cyber-attack, data corruption, and an error in the set of data.

2. The method as claimed in claim 1, further comprising stopping, by the at least one processor, the transmission of at least one of the plurality of data logs to the recovery database from the intermediate log storage location in the event the at least one anomaly is detected at the primary database.

3. The method as claimed in claim 1, wherein at least one from among the primary database, the intermediate log storage location, and the recovery database corresponds to at least one from among a local server and a cloud-based server.

4. The method as claimed in claim 1, wherein the trained model corresponds to one from among a supervised machine learning model and an unsupervised machine learning model.

5. The method as claimed in claim 1, wherein the plurality of data logs associated with the set of data is transmitted from the primary database to the intermediate log storage location by using a pull model.

6. The method as claimed in claim 1, further comprising receiving, by the at least one processor via the communication interface, the set of data at a secondary database from the primary database, wherein the secondary database corresponds to a disaster recovery database.

7. A computing device configured to implement an execution of a method for providing database cyber resiliency, the computing device comprising:
 a processor;
 a memory; and
 a communication interface coupled to each of the processor and the memory, wherein the processor is configured to:
  receive, via the communication interface, a set of data from at least one source at a primary database;
  continuously monitor, using a trained model, for a potential detection of at least one anomaly in the set of data based on at least one activity performed on the set of data;
  transmit a plurality of data logs associated with the set of data from the primary database to an intermediate log storage location;
  introduce a predefined delay to the plurality of data logs at the intermediate log storage location prior to a transmission of the plurality of data logs to a recovery database; and
  perform a standby switchover to the recovery database in an event the at least one anomaly is detected at the primary database,
 wherein the trained model is configured to perform the monitoring for the potential detection of the at least one anomaly by using at least one from among a k-method analysis algorithm, a decision tree analysis algorithm, a k-nearest neighbor's analysis algorithm, a k-fold cross-validation analysis algorithm, and balanced class weight analysis algorithm, and
 wherein the at least one anomaly corresponds to an occurrence of at least one from among a cyber-attack, data corruption, and an error in the set of data.

8. The computing device as claimed in claim 7, wherein the processor is further configured to stop the transmission of at least one of the plurality of data logs to the recovery database from the intermediate log storage location in the event the at least one anomaly is detected at the primary database.

9. The computing device as claimed in claim 7, wherein at least one from among the primary database, the intermediate log storage location, and the recovery database corresponds to at least one from among a local server and a cloud-based server.

10. The computing device as claimed in claim 7, wherein the trained model corresponds to one from among a supervised machine learning model and an unsupervised machine learning model.

11. The computing device as claimed in claim 7, wherein the plurality of data logs associated with the set of data is transmitted from the primary database to the intermediate log storage location by using a pull model.

12. The computing device as claimed in claim 7, wherein the processor is further configured to receive, via the communication interface, the set of data at a secondary database from the primary database, wherein the secondary database corresponds to a disaster recovery database.

13. A non-transitory computer readable storage medium storing instructions for providing database cyber resiliency, the instructions comprising executable code which, when executed by a processor, causes the processor to:
 receive, via a communication interface, a set of data from at least one source at a primary database;
 continuously monitor, using a trained model, for a potential detection of at least one anomaly in the set of data based on at least one activity performed on the set of data;
 transmit a plurality of data logs associated with the set of data from the primary database to an intermediate log storage location;
 introduce a predefined delay to the plurality of data logs at the intermediate log storage location prior to a transmission of the plurality of data logs to a recovery database; and
 perform a standby switchover to the recovery database in an event the at least one anomaly is detected at the primary database,
 wherein the trained model is configured to perform the monitoring for the potential detection of the at least one anomaly by using at least one from among a k-method analysis algorithm, a decision tree analysis algorithm, a k-nearest neighbor's analysis algorithm, a k-fold cross-validation analysis algorithm, and balanced class weight analysis algorithm, and
 wherein the at least one anomaly corresponds to an occurrence of at least one from among a cyber-attack, data corruption, and an error in the set of data.

14. The storage medium as claimed in claim 13, wherein when executed by the processor, the executable code further causes the processor to stop the transmission of at least one of the plurality of data logs to the recovery database from the intermediate log storage location in the event the at least one anomaly is detected at the primary database.

15. The storage medium as claimed in claim 13, wherein at least one from among the primary database, the intermediate log storage location, and the recovery database corresponds to at least one from among a local server and a cloud-based server.

16. The storage medium as claimed in claim 13, wherein the trained model corresponds to one from among a supervised machine learning model and an unsupervised machine learning model.

17. The storage medium as claimed in claim 13, wherein the plurality of data logs associated with the set of data is transmitted from the primary database to the intermediate log storage location by using a pull model.

\* \* \* \* \*